(12) United States Patent
Katano et al.

(10) Patent No.: US 9,327,613 B2
(45) Date of Patent: May 3, 2016

(54) ARRANGEMENT STRUCTURE OF INVERTER IN FUEL CELL VEHICLE

(71) Applicant: TOYOTA JIDOSHA KABUSHIKI KAISHA, Toyota-shi, Aichi-ken (JP)

(72) Inventors: Koji Katano, Toyota (JP); Tsutomu Shirakawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/436,711

(22) PCT Filed: Aug. 12, 2014

(86) PCT No.: PCT/JP2014/071294
§ 371 (c)(1),
(2) Date: Apr. 17, 2015

(87) PCT Pub. No.: WO2015/049924
PCT Pub. Date: Apr. 9, 2015

(65) Prior Publication Data
US 2015/0246621 A1    Sep. 3, 2015

(30) Foreign Application Priority Data

Oct. 4, 2013  (JP) ................. 2013-208963

(51) Int. Cl.
| | | |
|---|---|---|
| *B60L 11/18* | (2006.01) | |
| *B60L 15/00* | (2006.01) | |
| *B60K 8/00* | (2006.01) | |
| *B60K 1/04* | (2006.01) | |
| *B60K 1/00* | (2006.01) | |

(52) U.S. Cl.
CPC ............. *B60L 15/007* (2013.01); *B60K 1/04* (2013.01); *B60K 8/00* (2013.01); *B60L 11/1883* (2013.01); *B60L 11/1892* (2013.01); *B60K 1/00* (2013.01); *B60K 2001/005* (2013.01); *B60K 2001/0438* (2013.01); *Y02E 60/50* (2013.01); *Y02T 10/7005* (2013.01)

(58) Field of Classification Search
CPC ............. B60L 15/007; B60L 11/1883; B60L 11/1892; B60L 11/00; B60K 1/00; B60K 8/00; B60K 1/04; B60K 2001/005; B60K 2001/0438; B60K 6/62; B60Y 2400/61
See application file for complete search history.

(56) References Cited

U.S. PATENT DOCUMENTS

| | | | | |
|---|---|---|---|---|
| 8,698,347 B2* | 4/2014 | Ishigaki | ................. | B60L 3/0007 307/10.1 |
| 2005/0205316 A1* | 9/2005 | Yamafuji | ................. | B60R 16/04 180/68.5 |
| 2011/0067942 A1* | 3/2011 | Takei | ................. | B60K 11/02 180/291 |
| 2015/0107920 A1* | 4/2015 | Sakamoto | ................. | B60K 1/00 180/65.31 |
| 2015/0305177 A1* | 10/2015 | Nakashima | .......... | H05K 5/0204 310/68 D |
| 2015/0375622 A1* | 12/2015 | Yamanaka | ............... | B60K 1/00 180/65.1 |

FOREIGN PATENT DOCUMENTS

JP       2009115048 A       5/2009

* cited by examiner

*Primary Examiner* — John Walters
*Assistant Examiner* — Brian Swenson
(74) *Attorney, Agent, or Firm* — Oliff PLC

(57) ABSTRACT

An arrangement structure of an inverter in a fuel cell vehicle, capable of protecting the inverter from an impact during a vehicle collision with a simple configuration, is provided. The inverter is arranged on a frame in an inclined posture so that an outer side surface faces the power control unit and so that a hydrogen side output connector is directed downward of the power control unit, and the hydrogen side output connector and a hydrogen side wire are connected through below the power control unit.

3 Claims, 6 Drawing Sheets

ARRANGEMENT STRUCTURE OF INVERTER IN FUEL CELL VEHICLE

TECHNICAL FIELD

The present invention relates to an arrangement structure of an inverter in a fuel cell vehicle.

BACKGROUND ART

A fuel cell system including a fuel cell is equipped with various pumps required for the operation of the fuel cell system. For example, the fuel cell system described in Patent Document 1 is equipped with a hydrogen circulation pump circulating hydrogen gas to supply an anode of a fuel cell with hydrogen gas which is fuel gas. In addition, to cool down the fuel cell heated to a high temperature during operation, the fuel cell system is equipped with a refrigerant circulation pump circulating refrigerant through the fuel cell.

The drive of this type of hydrogen circulation pump or the like is controlled by an inverter similarly mounted on the fuel cell system. The inverter controls the drive of the hydrogen circulation pump or the like by converting DC power generated by the fuel cell to AC power and appropriately supplies the AC power to the pump.

CITATION LIST

Patent Document

Patent Document 1: JP2009-115048 A

DISCLOSURE OF THE INVENTION

Problem to be Solved by the Invention

The hydrogen circulation pump and the refrigerant circulation pump used in the foregoing fuel cell system are driven by relatively high voltages. Therefore, DC power output from the fuel cell is generally boosted by a DC-DC converter and then input to an inverter.

Accordingly, caution is required, from the viewpoint of safety, in handling of an inverter to which high-voltage power is input. Particularly, for a vehicle equipped with a fuel cell system, it is necessary to employ a design in consideration of support for an impact to prevent an electric shock or other danger from being caused by the inverter in the outside during a vehicle collision. As a means of protecting the inverter from the impact during the vehicle collision, it is conceivable that the inverter itself and the periphery thereof are formed in a rigid construction. This, however, leads to a problem that the vehicle is increased in size and weight.

The present invention has been made in view of the above background. Therefore, it is an object of the present invention to provide an arrangement structure of an inverter in a fuel cell vehicle capable of protecting the inverter from an impact during a vehicle collision with a simple configuration.

Means for Solving the Problem

In order to solve the above problem, according to an aspect of the present invention, there is provided an arrangement structure of an inverter in a fuel cell vehicle, comprising: a fuel cell which is mounted on the fuel cell vehicle to generate DC power; a power control unit which is arranged on a frame of the fuel cell vehicle to control electric power in the fuel cell vehicle; and an inverter which has a first conversion section and a second conversion section for converting the DC power generated by the fuel cell to AC power, wherein the inverter includes: a first outer side surface and a second outer side surface which are outer side surfaces facing each other across the central portion of the inverter; an input connector which is provided on the first outer side surface to input DC power from the outside; a first output connector which is provided on the first outer side surface and connected to a first output wire to output the AC power converted by the first conversion section to the outside; and a second output connector which is provided on the second outer side surface and connected to a second output wire to output the AC power converted by the second conversion section to the outside, wherein the inverter is arranged on the frame in an inclined posture so that the second outer side surface faces the power control unit and so that the second output connector is directed downward of the power control unit; and wherein the second output connector and the second output wire are connected through below the power control unit.

According to the arrangement structure of the inverter in the fuel cell vehicle according to the present invention, the inverter is arranged in an inclined posture so that the second output connector is directed downward of the power control unit, thereby enabling the connection between the second output connector and the second output wire through below the power control unit. Therefore, there is no need to provide a large space for arranging the second output connector and the second output wire between the power control unit and the second outer side surface of the inverter, thereby enabling the inverter to be arranged closely to the power control unit.

The first output connector and the second output connector protrude from the first outer side surface and the second outer side surface facing each other, respectively, by which the outline of the inverter easily increases in size. Moreover, due to the first output wire and the second output wire provided, in their end portions, with connectors for connections to the first output connector and the second output connector, the region occupied by the inverter, the first output wire, and the second output wire further easily increases in size on a lateral side of the power control unit. The inverter, however, is arranged in the inclined posture as described above, thereby enabling the region occupied by their outer shapes to be reduced.

Specifically, according to the arrangement structure of the inverter in the fuel cell vehicle of the present invention, the inverter is arranged closely to the power control unit and the region occupied by the inverter, the first output wire, and the second output wire is reduced, thereby enabling the inverter and the power control unit to be formed in a compact size as a whole. Therefore, it is possible to arrange the inverter near the center of the fuel cell vehicle and to ensure a long distance from the outer side surface of the fuel cell vehicle subject to an impact during a vehicle collision, thereby enabling the inverter to be protected from the impact with a simple configuration.

Furthermore, also in the case of using a substrate which outputs electric power only from one side surface as a conversion section which converts DC power to AC power, the other side surface (the surface on the side opposite to the foregoing one side surface) of the substrate functioning as a first conversion section is placed to face the other side surface (the surface on the side opposite to the foregoing one side surface) of the substrate functioning as a second conversion section to enable an arrangement so that the substrates output electric power in the opposite direction from each other. Therefore, the substrates having the same form can be used for the substrate functioning as the first conversion section and the substrate functioning as the second conversion section.

Furthermore, in the arrangement structure of the inverter in the fuel cell vehicle according to the present invention, it is also preferable that the inverter and the power control unit are arranged side by side in the right and left direction, the inverter is arranged on the frame in an inclined posture so that the upper end portion of the inverter is closer to the power control unit than the lower end portion and so that the rear end portion is closer to the power control unit than the front end portion, and the input connector is provided in a location near the rear end portion in the first outer side surface.

In this preferred embodiment, first, the inverter is arranged in an inclined posture so that the upper end portion of the inverter is closer to the power control unit than the lower end portion. This enables the second output connector provided on the second outer side surface of the inverter to be directed downward of the power control unit.

Moreover, the inverter is arranged in an inclined posture so that the rear end portion of the inverter is closer to the power control unit than the front end portion. Thereby, in the first outer side surface of the inverter, a location closer to the rear end portion is separated a longer distance from the outer side surface of the fuel cell vehicle. Therefore, the provision of the input connector in the location near the rear end portion in the first outer side surface enables the input connector, to which high-voltage power is input, to be protected from an impact during a vehicle collision more reliably.

Note here that the term "right and left direction" means the right and left direction when facing in the advance direction of the fuel cell vehicle. Moreover, as for the upper end portion and the lower end portion, both are based on the vertical direction: the term "upper end portion" means an end portion on the upper side and the term "lower end portion" means an end portion on the lower side. Furthermore, as for the front end portion and the rear end portion, assuming that the advance direction of the fuel cell vehicle is forward and that the reverse direction of the fuel cell vehicle is backward, the term "front end portion" means an end portion on the forward side and the term "rear end portion" means an end portion on the backward side.

Moreover, in the arrangement structure of the inverter in the fuel cell vehicle according to the present invention, it is also preferable that the first output connector outputs AC power to a cooling water pump which supplies the fuel cell with cooling water and the second output connector outputs AC power to a hydrogen pump which supplies the fuel cell with hydrogen for power generation.

The cooling pump is preferably arranged movably within a predetermined range by using a rubber mount or the like to reduce the influence of vibration generated during driving of the cooling water pump. On the other hand, the inverter is preferably fixed to the frame without looseness. Therefore, a change occurs in the relative position of the cooling water pump to the inverter during driving of the cooling water pump. To reduce the influence of the change in the relative position, preferably the cooling water pump is arranged in a position separate from the inverter. Due to the use of the arrangement in which the components are separated from each other as described above, however, an electrical connection work for outputting AC power from the inverter to the cooling water pump imposes a heavy burden.

Accordingly, in this preferred embodiment, the first output connector is assumed to output AC power to the cooling water pump which supplies the fuel cell with cooling water. This enables the first output wire to be connected to the first output connector provided on the first outer side surface not facing the power control unit in a relatively large space without interference with the power control unit, thereby enabling a drastic reduction of the burden imposed by the connection work.

On the other hand, the second output connector is assumed to output AC power to the hydrogen pump which supplies the fuel cell with hydrogen for power generation. Since the second output connector is provided on the second outer side surface facing the power control unit, it is necessary to perform a connection work with consideration to prevent interference with the power control unit and therefore the burden imposed by the connection work is heavier than in the case of the first output connector. Regarding the hydrogen pump, however, there is no strong need to arrange the hydrogen pump to be separated from the inverter as in the case of the cooling water pump and therefore the hydrogen pump is able to be arranged more closely to the power control unit than in the case of the cooling water pump. This enables a drastic reduction of the burden imposed by the connection work in the first output connector while suppressing an increase in the burden imposed by the connection work in the second output connector.

Effect of the Invention

The present invention provides an arrangement structure of an inverter in a fuel cell vehicle capable of protecting the inverter from an impact during a vehicle collision with a simple configuration.

MODE FOR CARRYING OUT THE INVENTION

Figure 1:
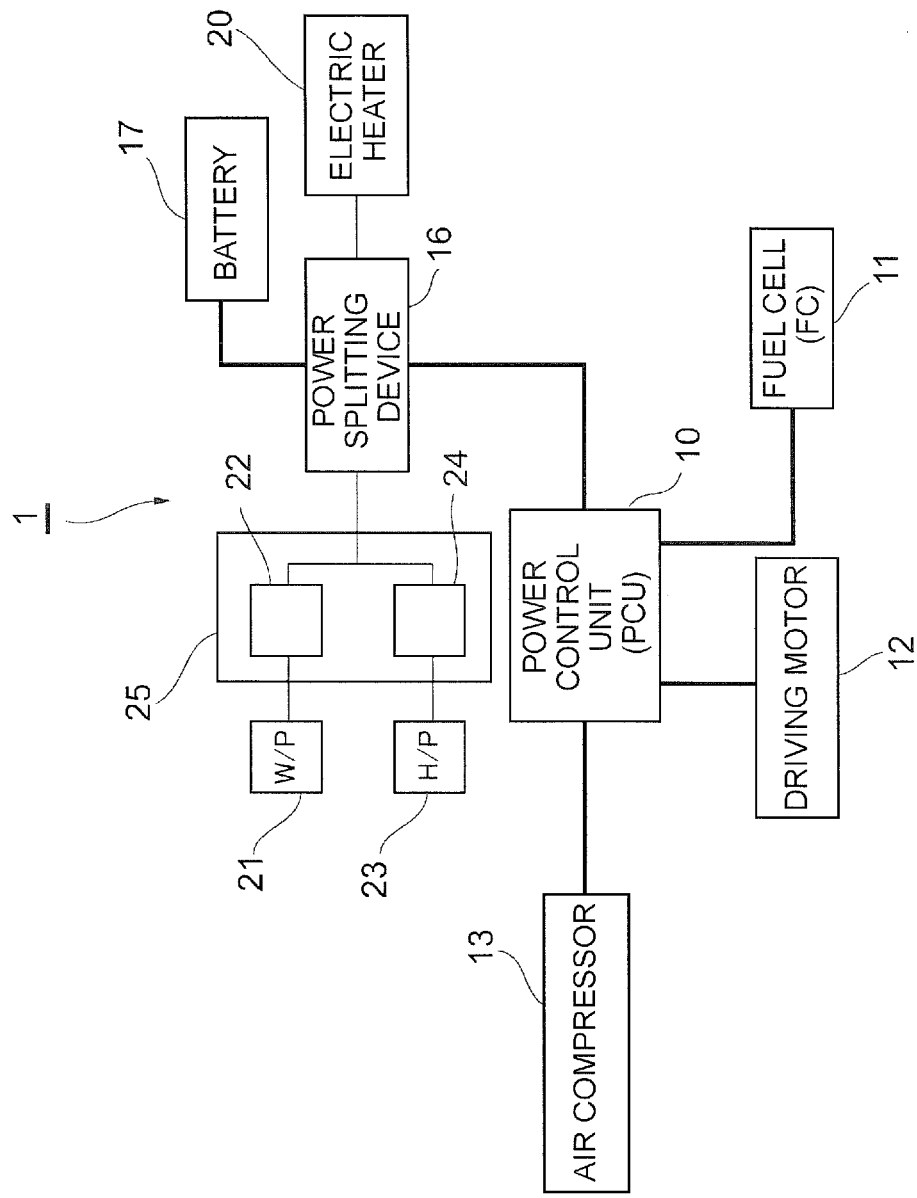
FIG. 1 is a schematic diagram illustrating the configuration of an electrical system of a fuel cell vehicle according to an embodiment of the present invention.

Hereinafter, an embodiment of the present invention will be described with reference to the accompanying drawings. To facilitate the understanding of the present invention, the same reference numerals are used to designate the components identical to those in the respective drawings wherever possible and redundant description thereof will be omitted.

First, an electrical system of a fuel cell vehicle according to the embodiment of the present invention will be described with reference to FIG. 1. FIG. 1 is a schematic diagram illustrating the configuration of an electrical system of the fuel cell vehicle FCV according to the embodiment of the present invention.

In a vehicular fuel cell system 1, there are electrically connected a fuel cell (FC) 11, a driving motor 12, an air compressor 13, and a power splitting device 16 to a power control unit (PCU) 10. Moreover, a battery 17, an electric heater 20, and an inverter 25 are electrically connected to the power splitting device 16.

The power control unit 10, which is a unit for controlling electric power in a vehicle equipped with the vehicular fuel cell system 1, supplies the driving motor 12 and the air compressor 13 with electric power generated by the fuel cell 11 or stored in the battery 17 and further supplies the battery 17, the electric heater 20, and the inverter 25 with electric power through the power splitting device 16. The driving motor 12 is an electric motor rotationally driving the front wheels for the running of the vehicle. The air compressor 13 is a device for supplying air to the cathode of the fuel cell 11 when the fuel cell 11 generates power. The battery 17 is a secondary battery which stores surplus power generated by the fuel cell 11. The electric heater 20 is used to appropriately heat the fuel cell 11 to increase the temperature thereof.

The inverter 25 is a unit incorporating a cooling water pump inverter 22 and a hydrogen pump inverter 24. The cooling water pump inverter 22 is electrically connected to a cooling water pump 21 which supplies cooling water to the fuel cell 11 to control the drive of the cooling water pump 21. Moreover, the hydrogen pump inverter 24 is electrically connected to a hydrogen pump 23 which supplies hydrogen gas to the anode of the fuel cell 11 to control the drive of the hydrogen pump 23.

Figure 2:
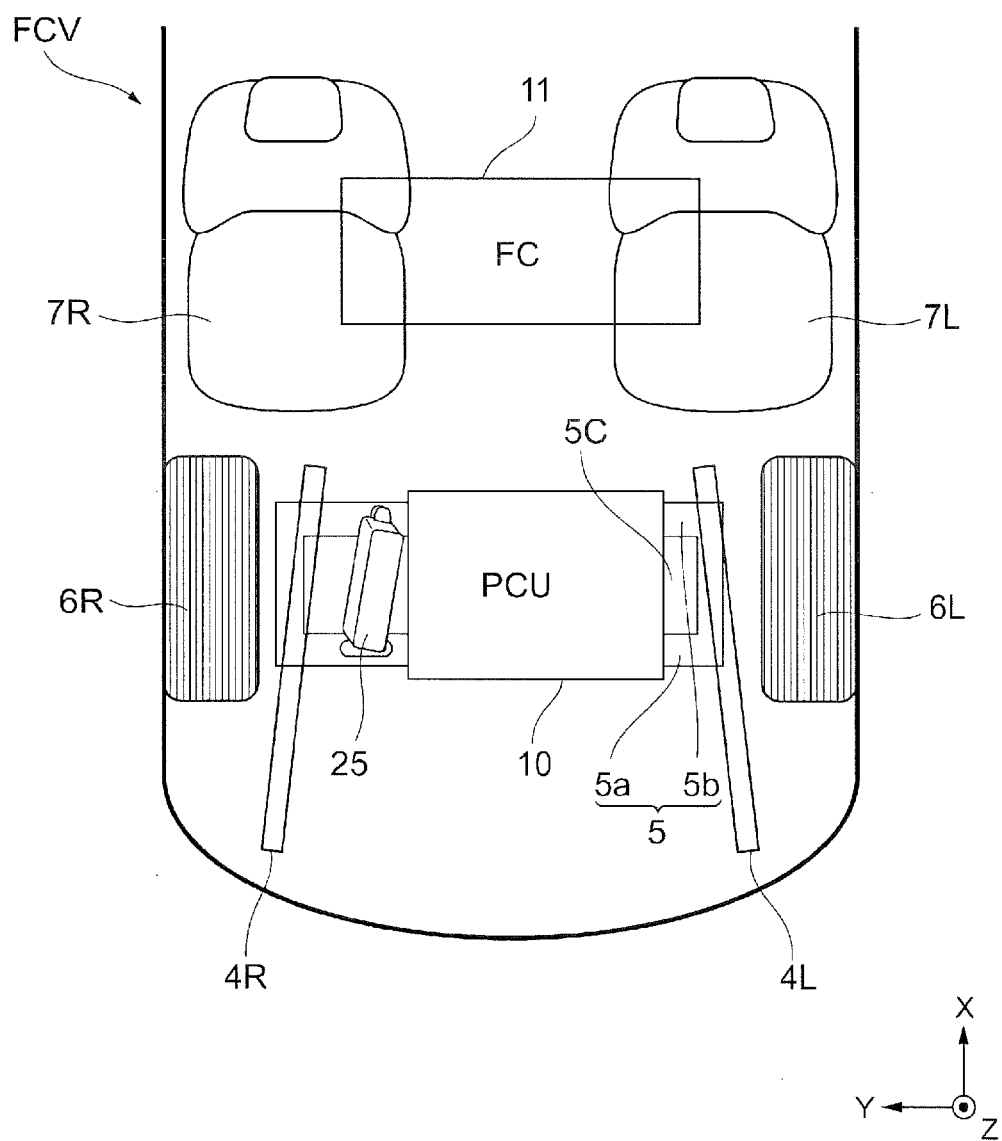
FIG. 2 is a schematic diagram illustrating the fuel cell vehicle according to the embodiment of the present invention, viewed from above.

Subsequently, the fuel cell vehicle FCV according to the embodiment of the present invention will be described with reference to FIG. 2. FIG. 2 is a schematic diagram illustrating the fuel cell vehicle FCV according to the embodiment of the present invention, viewed from above.

In the following description, the term "forward" means the advance direction (the −X direction on the XYZ coordinates illustrated in FIG. 2 or the like) of the fuel cell vehicle FCV and the term "backward" means the reverse direction (the X direction on the XYZ coordinates illustrated in FIG. 2 or the like) of the fuel cell vehicle FCV. Moreover, the term "right side" means the right-hand side (the Y direction on the XYZ coordinates illustrated in FIG. 2 or the like) when facing in the advance direction of the fuel cell vehicle FCV and the term "left side" means the left-hand side (the −Y direction on the XYZ coordinates illustrated in FIG. 2 or the like) when facing in the advance direction of the fuel cell vehicle FCV.

The fuel cell (FC) 11 is arranged below a driver's seat 7R and a passenger seat 7L of the fuel cell vehicle FCV and under the floor panel. Moreover, a pair of front side frames 4R and 4L extending in the anteroposterior direction are provided spaced from each other on the right and left sides of the fuel cell vehicle FCV. The metallic front side frames 4R and 4L are provided in such a way that a distance therebetween increases from back to front in the form of a truncated chevron when viewed from above. Furthermore, a metallic frame 5 extending in the right and left direction is provided between the front wheels 6R and 6L of the fuel cell vehicle FCV and fixed to the front side frames 4R and 4L. The frame 5 has a forward-side frame 5a and a backward-side frame 5b provided with a gap 5c therebetween in the anteroposterior direction.

The power control unit (PCU) 10 is arranged on the frame 5 like a bridge over the gap 5c in a position near the center in the right and left direction of the fuel cell vehicle FCV and fixed to the respective upper surfaces of the forward-side frame 5a and the backward-side frame 5b.

The inverter 25 is arranged on the frame 5 like a bridge over the gap 5c in a position on the right side of the power control unit 10 and fixed to the respective upper surfaces of the forward-side frame 5a and the backward-side frame 5b.

Figure 3:
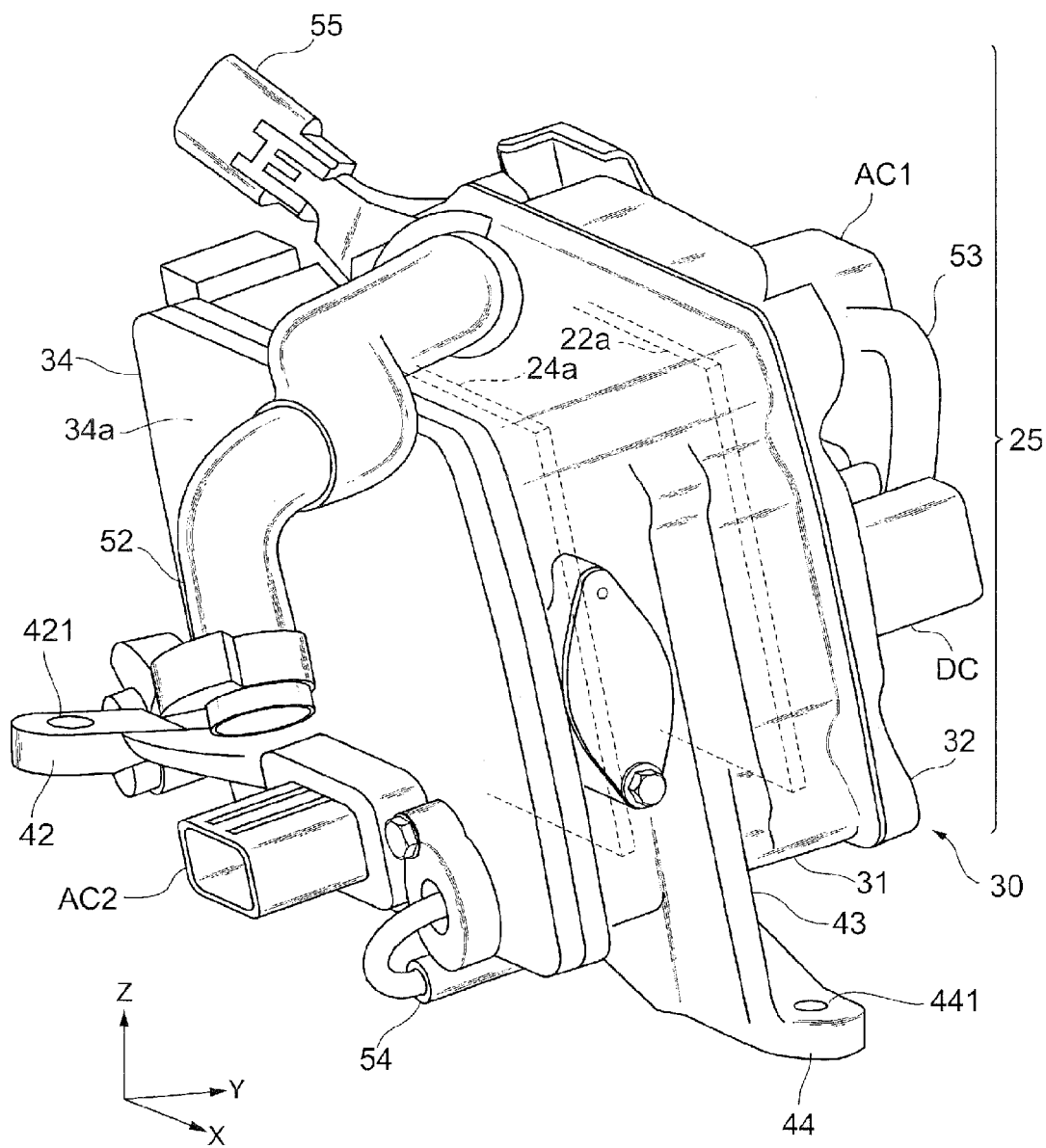
FIG. 3 is a perspective view illustrating an inverter according to the embodiment of the present invention, viewed from the back of the inverter.
Figure 4:
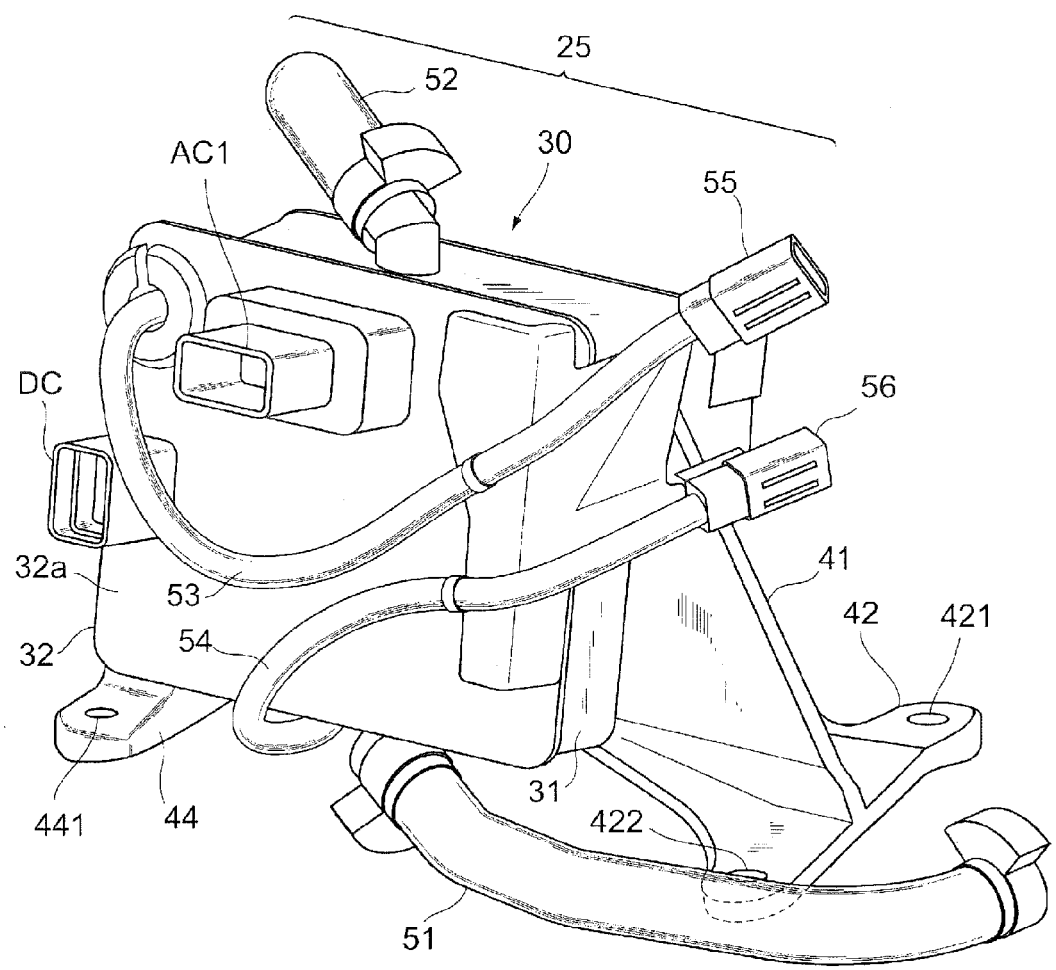
FIG. 4 is a perspective view illustrating the inverter according to the embodiment of the present invention, viewed from the front of the inverter.

The following describes the inverter 25 of the fuel cell vehicle FCV according to the embodiment of the present invention with reference to FIGS. 3 and 4. FIG. 3 is a perspective view illustrating the inverter 25 according to the embodiment of the present invention, viewed from the back of the inverter 25. FIG. 4 is a perspective view illustrating the inverter 25 according to the embodiment of the present invention, viewed from the front of the inverter.

The inverter 25 has a metallic case 30 which is substantially rectangular parallelepiped in the outer shape. As illustrated in FIG. 3, the case 30 is formed so as to have a hollow box shape by a frame-like body 31 with both end portions opened and an outer cover 32 and an inner cover 34 which cover both end portions of the body 31, respectively. Thereby, an outer side surface 32a (see FIG. 4) of the outer cover 32 and an outer side surface 34a (see FIG. 3) of the inner cover 34 are provided as outer side surfaces facing each other across the central portion of the inverter 25.

The case 30 houses a cooling water pump inverter 22 (see FIG. 1) and a hydrogen pump inverter 24 (see FIG. 1). More specifically, as partially illustrated by a broken line in FIG. 3, a substrate 22a of the cooling water pump inverter 22 and a substrate 24a of the hydrogen pump inverter 24 are arranged in the inside of the case 30.

The substrates 22a and 24a function as conversion sections which convert supplied electric power from DC to three-phase AC. For the substrates 22a and 24a, substrates having the same shape are adopted with various electric elements (not illustrated) such as a switching element and a capacitor provided on the substrates. The substrate 22a is arranged to extend along the outer cover 32 and outputs electric power only from one side surface on the outer cover 32 side. On the other hand, the substrate 24a is arranged to extend along the inner cover 34 and outputs electric power only from one side surface on the inner cover 34 side. In other words, the substrates 22a and 24a are arranged so that the other side surfaces from which electric power is not output face each other and so that AC power is output in opposite directions to each other.

As illustrated in FIG. 3, a plate-like backward-side supporting plate 43 is provided by forming a part of the lower end portion of the case 30 to protrude downward below the inverter 25. In addition, as illustrated in FIGS. 3 and 4, a backward-side leg portion 44 extending in the right and left direction is formed integrally with the backward-side supporting plate 43 at the lower end of the backward-side supporting plate 43. A vertically-penetrating fixing hole 441 is bored in the backward-side supporting plate 43.

As illustrated in FIG. 4, a triangular-plate-like forward-side supporting plate 41 is provided by forming a front end portion of the case 30 to protrude forward in front of the inverter 25. Moreover, a forward-side leg portion 42 extending in the horizontal direction is formed integrally with the forward-side supporting plate 41 at the lower end of the forward-side supporting plate 41. Vertically-penetrating fixing holes 421 and 422 are bored in the right and left end portions of the forward-side leg portion 42, respectively.

The outer cover 32 of the case 30 is provided with an input connector DC and a cooling water side output connector AC1 so as to protrude outward from the outer side surface 32a of the outer cover 32.

The input connector DC is provided so as to protrude in a substantially perpendicular direction to the outer side surface 32a in a location near the rear end portion and near the central portion in the vertical direction in the outer side surface 32a. The input connector DC is a connector serving as an electrical contact with the outside of the inverter 25 for inputting the DC power generated by the fuel cell 11 (see FIG. 1) to the inverter 25. The DC power input from the input connector DC is electrically distributed in the inside of the case 30 and then input to each of the substrate 22a of the cooling water pump inverter 22 and the substrate 24a of the hydrogen pump inverter 24.

The cooling water side output connector AC1 is provided so as to protrude in the substantially perpendicular direction to the outer side surface 32a in a location near the upper end portion and near the central portion in the anteroposterior direction in the outer side surface 32a. The cooling water side output connector AC1 is a connector serving as an electrical contact with the outside of the inverter 25 for outputting the electric power converted from DC to three-phase AC by the substrate 22a of the cooling water pump inverter 22 to the outside of the case 30. The cooling water side output connector AC1 is connected to a cooling water side plug AC1P of a cooling water side wire AC1W extending from the cooling water pump 21 as described later, by which the AC power is output to the cooling water pump 21.

As illustrated in FIG. 3, the inner cover 34 of the case 30 is provided with a hydrogen side output connector AC2 so as to protrude outward from the outer side surface 34a.

The hydrogen side output connector AC2 is provided in a location near the lower end portion and near the central portion in the anteroposterior direction in the outer side surface 34a. The hydrogen side output connector AC2 is a connector serving as an electrical contact with the outside of the inverter 25 for outputting electric power converted from DC to three-phase AC by the substrate 24a of the hydrogen pump inverter 24 to the outside of the case 30. The hydrogen side output connector AC2 is connected to a hydrogen side plug AC2P of the hydrogen side wire AC2W extending from the hydrogen pump 23 as described above, by which the AC power is output to the hydrogen pump 23.

Moreover, a cooling water side signal line 53 is led out to the outside through the outer cover 32 from the inside of the case 30 of the inverter 25 (see FIG. 4) and a hydrogen side signal line 54 is led out to the outside through the inner cover 34 from the inside of the case 30 of the inverter 25 (see FIG. 3). The cooling water side signal line 53 is for use in performing communication of control signals or the like with the substrate 22a of the cooling water pump inverter 22 and the hydrogen side signal line 54 is for use in performing communication of control signals or the like with the substrate 24a of the hydrogen pump inverter 24. A cooling water side signal line terminal 55 provided in the end portion of the cooling water side signal line 53 and a hydrogen side signal line terminal 56 provided in the end portion of the hydrogen side signal line 54 are directed to the forward side from the viewpoint of facilitating a connection work with other devices arranged in an engine room of the fuel cell vehicle FCV (see FIG. 2).

As illustrated in FIG. 4, a cooling water supply pipe 51 is connected to the lower surface in the outer side surface of the case 30 and a cooling water discharge pipe 52 is connected to the upper surface of the case 30. Both of the cooling water supply pipe 51 and the cooling water discharge pipe 52 are pipes having flexibility and communicate with the inside of the case 30. The substrate 22a of the cooling water pump inverter 22 and the substrate 24a of the hydrogen pump inverter 24 arranged in the inside of the case 30 easily rise in temperature in response to a rise in voltage and an excessive temperature rise might cause a damage of the substrate 22a and the substrate 24a. Therefore, in this inverter 25, the substrates 22a and 24a are cooled down by cooling water supplied to the inside of the case 30 through the cooling water supply pipe 51 to prevent the excessive temperature rise.

Figure 5:
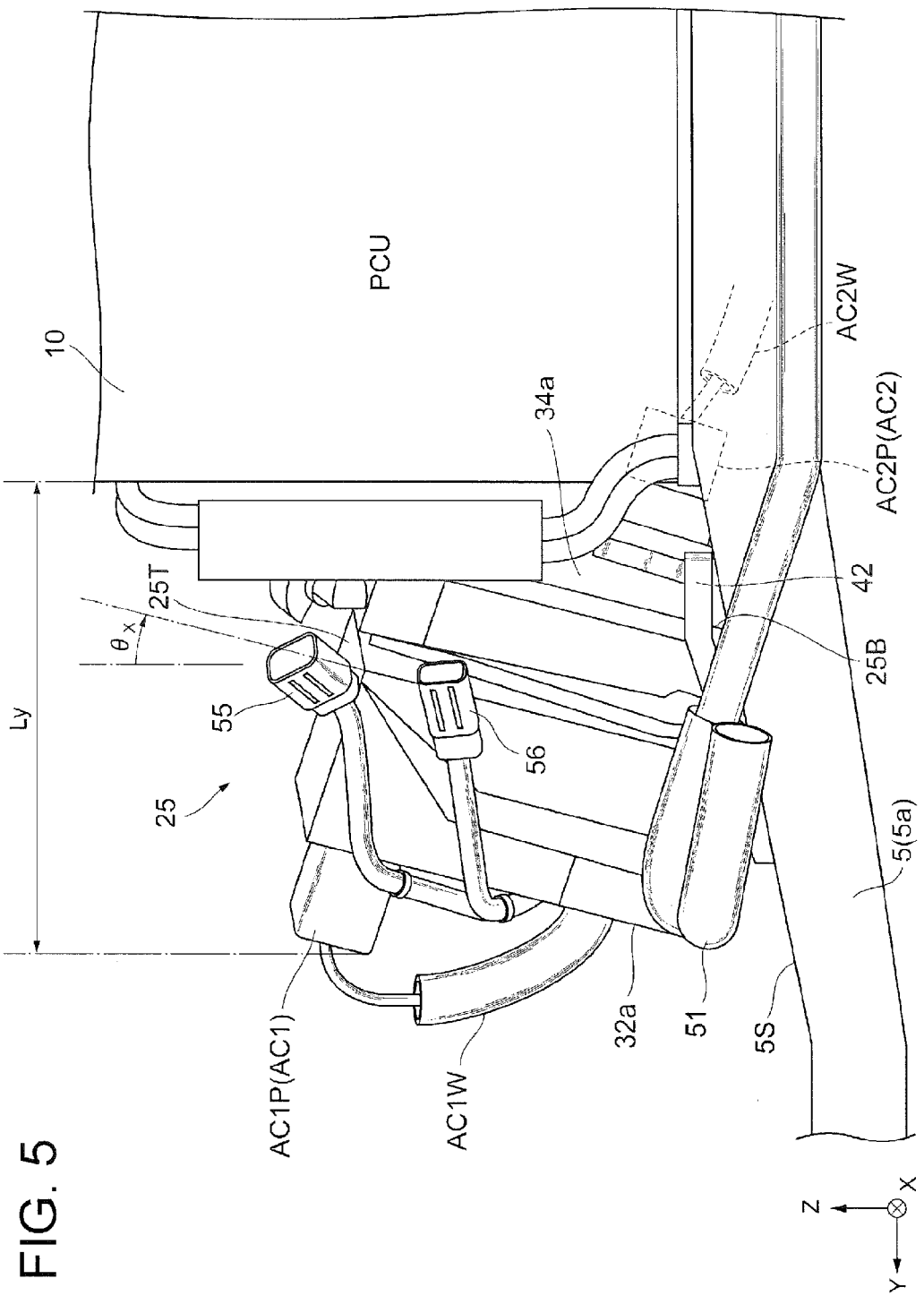
FIG. 5 is a front view illustrating the vicinity of a power control unit and an inverter according to the embodiment of the present invention.
Figure 6:
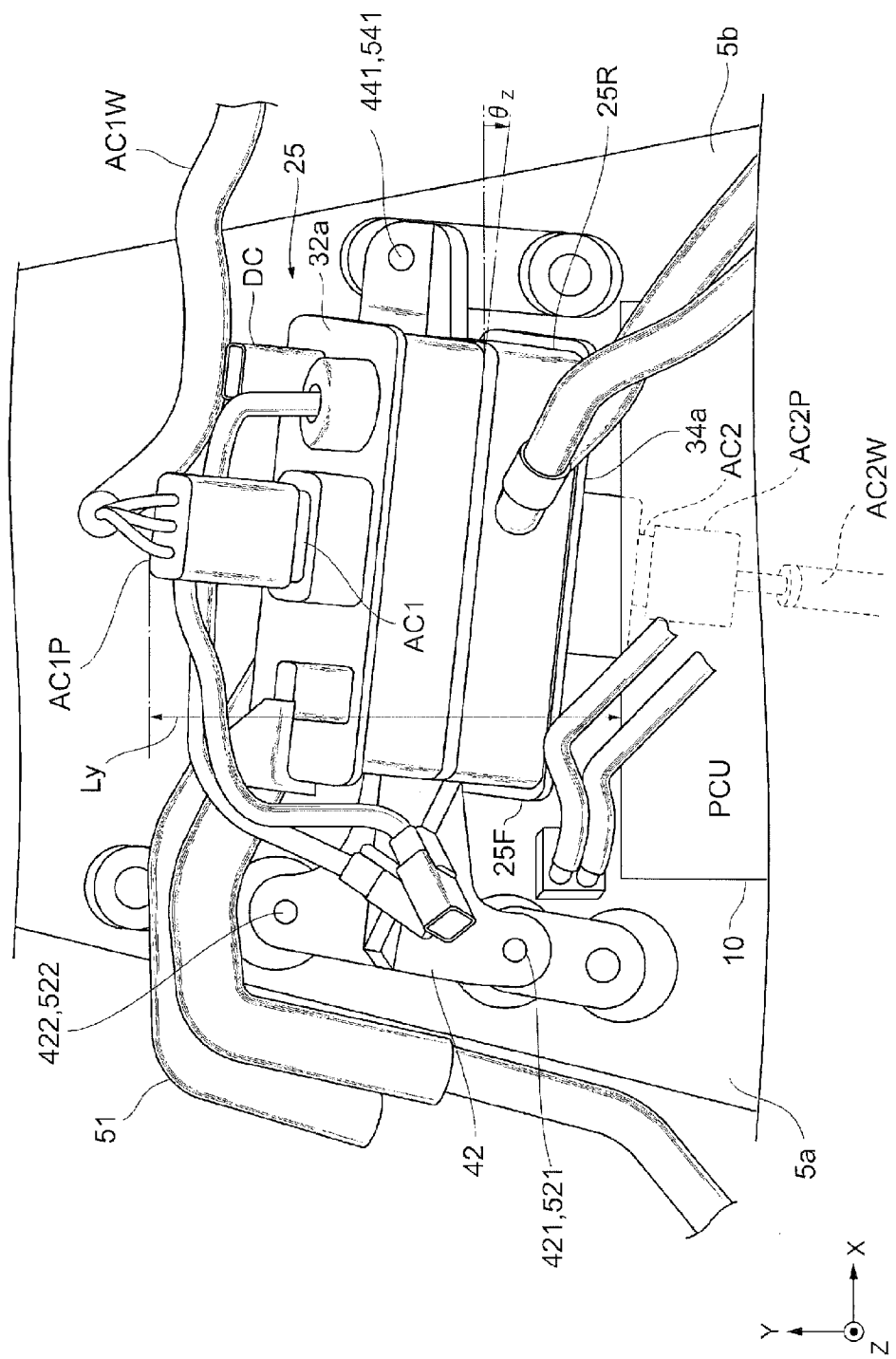
FIG. 6 is a top view illustrating the vicinity of the power control unit and the inverter according to the embodiment of the present invention.

The following describes the arrangement structure of the inverter 25 in the fuel cell vehicle FCV according to the embodiment of the present invention with reference to FIGS. 5 and 6. FIG. 5 is a front view illustrating the vicinity of the power control unit 10 and the inverter 25 according to the embodiment of the present invention. FIG. 6 is a top view illustrating the vicinity of the power control unit 10 and the inverter 25 according to the embodiment of the present invention.

As described in the above with reference to FIG. 2, the inverter 25 is arranged on the right side of the power control unit 10 and in a position near the right end of the fuel cell vehicle FCV. Moreover, the inverter 25 is arranged in an inclined posture about two axes of the X axis and the Z axis relative to the power control unit 10 by bolting the forward-side leg portion 42 and the backward-side leg portion 44 to the frame 5. Hereinafter, the fixing of the inverter 25 and the inclined posture thereof will be described.

Before fixing the inverter 25, the hydrogen side plug AC2P provided in the end portion of the hydrogen side wire AC2W is connected to the hydrogen side output connector AC2 of the inverter 25 in a position slightly away from the power control unit 10 fixed to the upper surface 5S (see FIG. 5) of the frame 5. As described above, the hydrogen side wire AC2W extends from the hydrogen pump 23 (see FIG. 1) and is used to output AC power from the hydrogen side output connector AC2 to the hydrogen pump 23.

Subsequently, the inverter 25 connected to the hydrogen side plug AC2P is brought closer to the power control unit 10 so that the outer side surface 34a of the inverter 25 faces the power control unit 10. Then, as illustrated in FIG. 6, the inverter 25 is arranged so that fixing holes 421 and 422 bored in the forward-side leg portion 42 are allowed to communicate with fixing holes 521 and 522 bored in the upper surface of the frame 5 and so that a fixing hole 441 bored in the backward-side leg portion 44 is allowed to communicate with a fixing hole 541 bored in the upper surface of the frame 5. Bolts (not illustrated) are inserted into the fixing holes communicating with each other for fastening, by which the forward-side leg portion 42 and the backward-side leg portion 44 are fixed to the upper surface 5S of the frame 5 and the inverter 25 is fixed.

The inverter 25 is fixed to the frame 5 at three points, thereby inhibiting the rotation of the case 30 about a fixing point during collision of the fuel cell vehicle FCV (see FIG. 2). This enables the cooling water pump inverter 22 and the hydrogen pump inverter 24 (see FIG. 1) housed in the case 30 to be protected from the impact during the vehicle collision.

As illustrated in FIG. 5, the frame 5 is formed so that a part of the upper surface 5S of the frame 5 has a rising slope from the outside of the fuel cell vehicle FCV toward the center thereof in the right and left direction. Therefore, regarding the positional relation between the power control unit 10 fixed to the upper surface 5S and the inverter 25, the lower end portion of the inverter 25 arranged near the outside of the fuel cell vehicle FCV is offset downward to the lower end portion of the power control unit 10 arranged near the center.

Moreover, when the inverter 25 is fixed to the frame 5, the inverter 25 has a posture in which the upper end portion 25T of the inverter 25 is closer to the power control unit 10 than the lower end portion 25B of the inverter 25. In other words, the inverter 25 has an inclined posture in which the upper end portion 25T thereof is rotated by an angle $\theta x$ about the X axis.

In this manner, the inverter 25 has a posture in which the hydrogen side output connector AC2 provided near the lower end portion of the outer side surface 34a is directed downward of the power control unit 10 by the arrangement where the lower end portion of the inverter 25 is offset downward to the lower end portion of the power control unit 10 and is fixed to be inclined at an angle θx about the X axis. This enables the hydrogen side output connector AC2 and the hydrogen side wire AC2W to be arranged in the gap 5c (see FIG. 2) of the frame 5 located beneath the power control unit 10 in the lower place than the power control unit 10.

In this manner, the hydrogen side output connector AC2 and the hydrogen side wire AC2W are connected through below the power control unit 10. Thereby, there is no need to provide a large space for arranging the hydrogen side output connector AC2 and the hydrogen side wire AC2W between the power control unit 10 and the second outer side surface 34a of the inverter 25. This enables the inverter 25 to be arranged closely to the power control unit 10.

Moreover, the inverter 25 is fixed to be inclined at the angle θx about the X axis, by which the cooling water side output connector AC1 provided near the upper end portion of the first outer side surface 32a get closer to the power control unit 10. Accordingly, even in the case where the cooling water side output connector AC1 is provided so as to protrude from the first outer side surface 32a, the region occupied by the outer shape of the inverter 25 can be reduced.

As described hereinabove, a region Ly occupied by the inverter 25 in the Y-axis direction on the right side of the power control unit 10 can be reduced by arranging the inverter 25 closely to the power control unit 10 and reducing the region occupied by the inverter 25, the cooling water side wire AC1W, and the hydrogen side wire AC2W. This enables the inverter 25 and the power control unit 10 to be formed in a compact size as a whole.

Therefore, it is possible to arrange the inverter 25 near the center of the fuel cell vehicle FCV (see FIG. 2) and to ensure a long distance to the inverter 25 from the outer side surface of the fuel cell vehicle FCV subject to an impact during a vehicle collision, thereby enabling the inverter 25 to be protected from the impact with a simple configuration.

Furthermore, as illustrated in FIG. 6, when the inverter 25 is fixed to the frame 5, the inverter 25 is arranged in a posture where the rear end portion 25R thereof is closer to the power control unit 10 than the front end portion 25F. In other words, the inverter 25 is brought into a posture in which the rear end portion 25R thereof is rotated by the angle θz about the Z axis.

In the outer side surface 32a of the inverter 25, the inclination at the angle θz about the Z axis causes a location closer to the rear end portion 25R to be nearer the center of the fuel cell vehicle FCV and to be separated a longer distance from the outer side surface of the fuel cell vehicle FCV. Therefore, the provision of the input connector DC in the location near the rear end portion 25R of the outer side surface 32a enables the input connector DC, to which high-voltage power is input from the outside, to be protected from an impact during a vehicle collision more reliably.

The inverter 25 fixed to the frame 5 is connected to a plug (not illustrated) of a wire for inputting DC power to the input connector DC provided in the outer side surface 32a of the inverter 25, and the cooling water side output connector AC1 is connected to the cooling water side plug AC1P of the cooling water side wire AC1W extending from the cooling water pump 21 (see FIG. 1).

The cooling water pump 21 vibrates during driving, thereby causing a change in the relative position of the cooling water pump 21 to the inverter 25. To reduce the influence of the change in the relative position, preferably the cooling water pump 21 is arranged in a position separated from the inverter 25. Due to the use of the arrangement in which the components are separated from each other as described above, however, an electrical connection work for outputting AC power to the cooling water pump 21 from the inverter 25 imposes a heavy burden.

In this respect, unlike the outer side surface 34a, the outer side surface 32a does not face the power control unit 10. Therefore, the connection work between the cooling water side output connector AC1 and the cooling water side wire AC1W is able to be performed in a relatively large space without interference with the power control unit 10. In other words, also in the case where the cooling water pump 21 is provided in a position separated from the inverter 25, the burden of the connection work is able to be drastically reduced.

On the other hand, the hydrogen side output connector AC2 for outputting AC power to the hydrogen pump 23 is provided on the second outer side surface 34a of the inverter 25. The provision of the hydrogen side output connector AC2 on the second outer side surface 34a facing the power control unit 10 causes the necessity of performing the connection work with consideration to prevent interference with the power control unit 10, thereby increasing the burden imposed by the connection work in comparison with the burden in the case of the cooling water side output connector AC1. Regarding the hydrogen pump 23, however, there is no strong need to arrange the hydrogen pump 23 to be separated from the inverter 25 as in the case of the cooling water pump 21 and therefore the hydrogen pump 23 is able to be arranged closer to the power control unit 10 than the cooling water pump 21. This enables a drastic reduction of the burden imposed by the connection work in the cooling water side output connector AC1 while suppressing an increase in the burden imposed by the connection work in the hydrogen side output connector AC2.

The foregoing has described exemplary embodiments of the present invention with reference to specific examples. The present invention, however, is not limited to these specific examples. In other words, appropriate design modifications made by one skilled in the art to these specific examples are also within the scope of the present invention as long as they include the features of the present invention. For example, the elements included in the specific examples and the arrangement, material, condition, shape, size, etc. of the elements are not limited to those illustrated and may be appropriately modified. Moreover, it should be understood that the elements included in the foregoing embodiments may be combined with each other as long as technically possible and combinations thereof are also included in the scope of the present invention as long as they include the features of the present invention.

DESCRIPTION OF THE REFERENCE NUMERALS

1: Vehicular fuel cell system, 10: Power control unit, 11: Fuel cell, 21: Cooling water pump, 22: Cooling water pump inverter (First conversion section), 23: Hydrogen pump, 24: Hydrogen pump inverter (Second conversion section), 25: Inverter, 25F: Front end portion (of inverter), 25R: Rear end portion (of inverter), 25T: Upper end portion (of inverter), 25B: Lower end portion (of inverter), 5: Frame, 32a: Outer side surface (of inverter) (First outer side surface), 34a: Outer side surface (of inverter) (Second outer side surface), AC1: Cooling water side output connector (First output connector), AC1W: Cooling water side wire (First output wire), AC2: Hydrogen side output connector (Second output connector), AC2W: Hydrogen side wire (Second output wire), DC: Input connector, FCV: Fuel cell vehicle

The invention claimed is:

1. An arrangement structure of an inverter in a fuel cell vehicle, comprising:
    a fuel cell that is mounted on the fuel cell vehicle and generates DC power;
    a power control unit that is arranged on a frame of the fuel cell vehicle and controls electric power in the fuel cell vehicle; and
    an inverter that has a first conversion section and a second conversion section for converting the DC power generated by the fuel cell to AC power,
    wherein the inverter has:
    a first outer side surface and a second outer side surface that are outer side surfaces facing each other across the central portion of the inverter;
    an input connector that is provided on the first outer side surface and inputs DC power from the outside;
    a first output connector that is provided on the first outer side surface and connected to a first output wire and outputs the AC power converted by the first conversion section to the outside; and
    a second output connector that is provided on the second outer side surface and connected to a second output wire and outputs the AC power converted by the second conversion section to the outside,
    wherein the inverter is arranged on the frame in an inclined posture so that the second outer side surface faces the power control unit and so that the second output connector is directed downward of the power control unit; and
    wherein the second output connector and the second output wire are connected through below the power control unit.

2. The arrangement structure of the inverter in the fuel cell vehicle according to claim 1,
    wherein the inverter and the power control unit are arranged side by side in the right and left direction,
    wherein the inverter is arranged on the frame in an inclined posture so that the upper end portion is closer to the power control unit than the lower end portion and so that the rear end portion is closer to the power control unit than the front end portion, and
    wherein the input connector is provided in a location near the rear end portion in the first outer side surface.

3. The arrangement structure of the inverter in the fuel cell vehicle according to claim 1,
    wherein the first output connector outputs AC power to a cooling water pump that supplies the fuel cell with cooling water and
    wherein the second output connector outputs AC power to a hydrogen pump that supplies the fuel cell with hydrogen for power generation.

* * * * *